IDRIS IVOR DAVIES
INVENTOR.

Patented Aug. 3, 1937

2,088,843

UNITED STATES PATENT OFFICE 2,088,843

UNIVERSAL MOISTURE BRIDGE

Idris Ivor Davies, Madison, Wis., dedicated to the free use of the People of the United States Application July 3, 1936, Serial No. 88,820

1 Claim. (Cl. 175—183)

(Granted under the act of March 3, 1883, as amended April 30, 1928; 370 O. G. 757)

This application is made under the act of March 3, 1883, as amended by the act of April 30, 1928, and the invention herein described and claimed may be manufactured and used by or for the Government for governmental purposes without the payment to me of any royalty thereon.

I hereby dedicate the invention herein described to the free use of the People of the United States to take effect on the granting of a patent to me.

This invention relates to new and improved methods of and apparatus for measuring the electrical resistance of substances, and evaluating their moisture content through the relationship existing between the electrical resistance and moisture content; especially in such materials as wood, grain, paper, cloth, and other hygroscopic materials.

I am well aware that moisture meters which evaluate moisture content through electrical resistance are not new in the art, and I make no basic claim for this method. I am likewise well aware that the use of a Wheatstone bridge circuit for the measurement of electrical resistance is old in the art. However, the simple Wheatstone bridge is not well adapted to the measurement of very high resistances because of the extremely sensitive galvanometer required, and for other reasons. The present invention overcomes these difficulties by substituting for the usual galvanometer an extremely sensitive and rugged null method of balancing the bridge. It also provides arrangements and devices which make it possible to embody the invention in a practical and portable instrument. An important advantage of this invention over the present art lies in the fact that with it very high resistances can be more easily and accurately measured.

Figure 1:
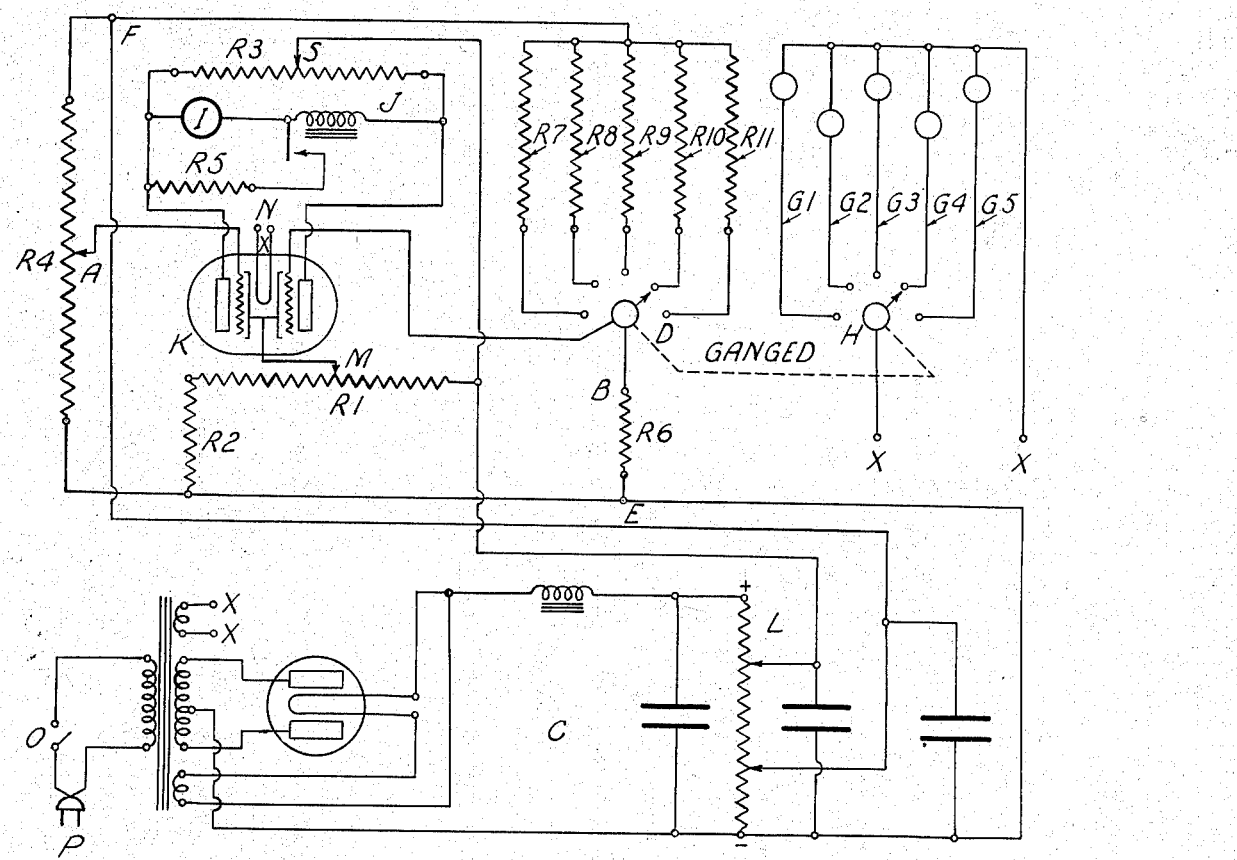
Figure 2:
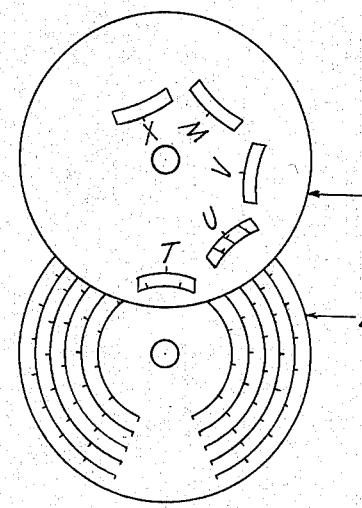

Figure 1 is a wiring diagram embodying the electrical principle of this invention; the additional wiring required to selectively illuminate the graduated circular scales on the potentiometer dial; and the additional wiring required to make the apparatus operable on an outside source of alternating current. Figure 2 illustrates the selective operating dials by which the proper graduated circular scale is selected for each respective position of the fixed resistance selector switch.

Referring now to Figure 1. The main resistance bridge is composed of the customary four arms as follows: R4 represents a slide wire or equivalent, with movable contact A. R6 represents the unknown resistance. R7 to R11 inclusive represent fixed resistors which may be cut in or out by means of the fixed resistance selector switch D. Any desired number of these fixed resistors may be used. Current supply is at points E and F. Voltage balance points are A and B. Dial lamps G1 to G5 inclusive are for selective dial illumination as will be explained later. They are controlled by a dial lamp switch H which is ganged with the fixed resistance selector switch D.

The balancing bridge circuit is as follows: The two grids of a duo-triode vacuum tube K are connected, respectively, to voltage balance points A and B. The two plates of said tube are connected to each other by the center-tapped resistance R3 in multiple with a current-indicating instrument I suitably protected by current limiting relay J and resistance R5. This current-indicating instrument I may well be a double-recording milliammeter with zero at the center of the scale; or it may be a very sensitive polar relay operating a pair of signal lamps. The center tap S of resistance R3 is adjustable and is connected to the positive tap of the voltage divider L of a conventional full-wave rectifier power unit C.

The cathode of tube K is connected at adjustable point M to a resistance R1 in series with a fixed resistance R2; said resistances being bridged across from the negative side of the power unit C to the positive tap of the voltage divider L. Said resistances function as a cathode voltage-controlling resistance. XX represent low-voltage alternating current supply for dial lamps G and cathode heater N.

The operation of this electrical resistance meter is as follows: the plug P is inserted in a receptacle supplied with suitable alternating current and the power switch O is closed. The balancing bridge circuit is then balanced by connecting together the two grids of tube K and shifting the point S on resistance R3 till the current-indicating instrument I reads zero. Once made, this adjustment is practically permanent for the life of the tube. Point M on resistance R1 is then shifted to adjust the voltage on the cathode of tube K to the desired value, (a value more positive than the charge on the grids of the tube) which will vary somewhat with the size of resistance R6 which is now placed in circuit. The proper fixed resistor (R7 to R11) is then selected by manipulating the fixed resistance selector switch D. Then the point A on the slide wire R4 is adjusted till the current-indicating instrument I shows a zero reading. If this instrument be a polar relay, the zero reading will obtain when both signal lamps are out. At this point the main resistance bridge will be in balance, and no current will be flowing through the current-indicating instrument I. The well-known Wheatstone bridge proportional equation permits immediate determination of the size of R6, the unknown resistance.

It will be obvious to those skilled in the art that various equivalents may be substituted for the precise elements described and illustrated. Various sources of direct current such as batteries or a direct-current generator may be substituted for the conventional full-wave rectifier power unit C without affecting the satisfactory operation of this invention. If direct current be used, a duo-triode without indirectly heated cathode may be effectively used.

Where conditions of operation are not critical a simplified modification of the vacuum-tube balance detector may be used. This modification employs a single triode vacuum tube with the plate connected directly to the positive tap of the voltage divider L, through a milliammeter. The grid is alternately connected to points A and B, and the previously-described adjustments of D and A made till the milliammeter reads the same in both positions when the main resistance bridge will be in balance.

An instrument for measuring resistance and embodying the described resistance bridge circuit should embody certain specific features of design to be most useful. Assuming conventional box and panel construction and the use of alternating current power supply, the instrument panel should contain the following: power switch O; dial for shifting M; current-indicating instrument I; dial for fixed resistance selector switch D; potentiometer dial for shifting point A; a pair of terminals for connecting the unknown resistance R6 into circuit. Cord and plug P should be provided.

For accurate and rapid reading of the resistance (or the moisture content in case the instrument is to be used as a moisture meter) the potentiometer dial should be provided with concentric circular scales as shown in Figure 2, one scale for each point on the fixed resistance selector switch, the scales to be suitably calibrated in megohms or percent moisture respectively, of the unknown resistance R6. Further, the proper scale for each of said points should be automatically selected as the dial of said fixed resistance selector switch is turned. One method of doing this is by means of the dial lamps G1—G5, Figure 1. Each dial lamp is located under its respective circular scale in such manner as to illuminate that scale alone, at the fixed zero mark. The scales must obviously be translucent for this type of selective illumination.

Another much simpler method of accomplishing the same result is shown in Figure 2. Y is the fixed resistance selector switch dial and Z is the potentiometer dial with the concentric calibrated scales, one for each fixed resistor (R7 to R11).

The fixed resistance selector switch dial Y is provided with five windows T, U, V, W and X, arranged at various radial distances and spaced around the circumference of the dial. Dial Y is positioned over dial Z and quite close to it, and the dials are of such size and so located that the periphery of dial Y approaches the axis of dial Z sufficiently to fall well inside the inner circular scale. The windows T, U, V, W, and X are so positioned on dial Y that when they are respectively in the position of window T in Figure 2 the scale corresponding to the fixed resistor on which the fixed resistance selector switch is set will be visible. Each window is engraved with a fixed zero mark and the dial Z may be shrouded and illuminated in any desired manner. When used as a moisture meter, the instrument should be provided with a pair of electrodes suited to the particular use intended. Various styles are known in the art. For wood, a pair of nails firmly driven in an inch or so apart and electrically connected to the appropriate terminals will serve very well. Special plate electrodes and needle electrodes will often be found to be more effective or more convenient than the nails.

Having thus described my invention and shown how it may be applied in use, what I claim for Letters Patent is:

An electrical system for measuring the direct current resistance of various substances, comprising a bridge circuit; said bridge circuit consisting of a high resistance slide wire, a plurality of fixed standard resistances, means adapted for connecting a resistance of unknown value into the bridge circuit formed by the high resistance slide wire, any one of the fixed standard resistances and the resistance of unknown value; means adapted for switching any one of the fixed standard resistances into or out of the bridge circuit formed by the slide wire, the resistance of unknown value and any one of the fixed standard resistances, means adapted for connecting the junction of the high resistance slide wire and the resistance of unknown value to the negative side of a direct current power supply system, means for connecting the junction of the high resistance slide wire and any one of the fixed standard resistances to an adjustable point on the positive side of a direct current power supply system; a bridge balance indicator; said bridge balance indicator consisting of a double triode vacuum tube having its cathode heater or filament connected to a proper current supply system, said double triode vacuum tube having one grid connected to the sliding contact of the high resistance slide wire in the bridge circuit and the other grid connected to the bridge circuit at the junction of the resistance of unknown value and the fixed standard resistance which may be switched into the bridge circuit; a zero center milliammeter, a milliammeter protecting relay, a milliammeter shunting resistance; said zero center milliammeter and milliammeter protecting relay connected in series between plate terminals of the double triode vacuum tube, said milliammeter shunting resistance connected between contacts of the milliammeter protecting relay and the zero center milliammeter in a manner which affords protection to the zero center milliammeter against excessive current; an adjustable tapped resistance having its ends connected to the plate terminals of the double triode vacuum tube and its adjustable terminal connected to an adjustable point on the positive side of a direct current power supply system; a fixed cathode voltage controlling resistance and an adjustable cathode voltage controlling resistance connected in series between the negative and positive sides of a direct current power supply system; said adjustable cathode voltage controlling resistance having its adjustable terminal connected to the cathodes of the double triode vacuum tube and adjusted to bring the voltage of the cathodes to value more positive than the voltage of the grids.

IDRIS IVOR DAVIES.